US009422072B2

United States Patent
Kikuchi et al.

(10) Patent No.: US 9,422,072 B2
(45) Date of Patent: Aug. 23, 2016

(54) OBJECT COLLECTING AND DISCHARGING DEVICE OF A COMBINATION WEIGHER INCLUDING FIRST THROUGH SIXTH DISCHARGE PATHS AND A COMBINATION WEIGHER USING THE SAME

(75) Inventors: Kohei Kikuchi, Takarazuka (JP); Kazuo Takayanagi, Akashi (JP)

(73) Assignee: YAMATO SCALE CO., LTD., Akashi-shi, Hyogo (JP)

( * ) Notice: Subject to any disclaimer, the term of this patent is extended or adjusted under 35 U.S.C. 154(b) by 182 days.

(21) Appl. No.: 14/354,558

(22) PCT Filed: Oct. 27, 2011

(86) PCT No.: PCT/JP2011/006015
§ 371 (c)(1),
(2), (4) Date: Apr. 25, 2014

(87) PCT Pub. No.: WO2013/061374
PCT Pub. Date: May 2, 2013

(65) Prior Publication Data
US 2014/0238537 A1    Aug. 28, 2014

(51) Int. Cl.
*G01G 19/393*    (2006.01)
*B65B 1/32*    (2006.01)
*B65B 5/06*    (2006.01)

(52) U.S. Cl.
CPC .............. *B65B 5/06* (2013.01); *G01G 19/393* (2013.01); *B65B 1/32* (2013.01)

(58) Field of Classification Search
CPC ... G01G 13/024; G01G 13/026; G01G 13/16; G01G 13/2952; G01G 19/387; G01G 19/393; B65B 1/32; B65B 5/06
See application file for complete search history.

(56) References Cited

U.S. PATENT DOCUMENTS

| 4,399,880 | A | * | 8/1983 | Konishi | G01G 19/393 177/1 |
| 4,444,283 | A | * | 4/1984 | Mikami | G01G 21/28 177/128 |
| 4,535,855 | A | * | 8/1985 | Izumi | B65B 1/32 177/1 |
| 4,558,774 | A | * | 12/1985 | Mikami | G01G 19/393 177/25.18 |
| 4,570,727 | A | * | 2/1986 | Ueda | G01G 13/16 177/25.18 |
| 4,602,709 | A | * | 7/1986 | Ueda | G01G 13/16 177/25.18 |
| 4,614,262 | A | * | 9/1986 | Konishi | G01G 19/393 177/25.18 |

(Continued)

FOREIGN PATENT DOCUMENTS

JP    2006-112895 A    4/2006
WO    WO-2007/069544 A1    6/2007

OTHER PUBLICATIONS

International Search Report for PCT/JP2011/006015, mailed Nov. 22, 2011.

*Primary Examiner* — Randy W Gibson
(74) *Attorney, Agent, or Firm* — Marshall, Gerstein & Borun LLP (57) ABSTRACT

An object collecting and discharging device, comprises an inner collecting chute; an outer collecting chute, a first discharge path having a first upper opening and a first lower opening; a second discharge path having a second upper opening, a third upper opening and a second lower opening; a third discharge path having a fourth upper opening and a third lower opening; a fourth discharge path having a fifth upper opening and a fourth lower opening; a fifth discharge path having a sixth upper opening, a seventh upper opening and a fifth lower opening; and a sixth discharge path having an eighth upper opening and a sixth lower opening.

5 Claims, 6 Drawing Sheets

(56) References Cited

U.S. PATENT DOCUMENTS

| | | | | |
|---|---|---|---|---|
| 4,618,012 A * | 10/1986 | Yamano | ............ | G01G 19/393 177/25.18 |
| 4,676,326 A * | 6/1987 | Konishi | ............ | G01G 19/393 177/1 |
| 4,753,306 A * | 6/1988 | Mosher | ............ | G01G 19/393 177/25.19 |
| 5,258,580 A * | 11/1993 | Bergholt | ............ | G01G 19/393 177/25.18 |
| 5,765,655 A * | 6/1998 | Tatsuoka | ............ | G01G 19/393 177/105 |
| 6,127,635 A * | 10/2000 | Zeyer | ............ | G01G 19/393 177/103 |
| 7,566,837 B2 * | 7/2009 | Kawanishi | ............ | G01G 19/393 177/25.18 |
| 8,115,118 B2 * | 2/2012 | Kawanishi | ............ | G01G 19/393 177/25.18 |
| 8,119,935 B2 * | 2/2012 | Kawanishi | ............ | G01G 19/393 177/25.18 |
| 8,247,710 B2 * | 8/2012 | Kawanishi | ............ | G01G 19/393 177/25.18 |
| 8,525,048 B2 * | 9/2013 | Kawanishi | ............ | 177/25.18 |
| 8,525,049 B2 * | 9/2013 | Kawanishi | ............ | 177/25.18 |
| 2012/0103703 A1 * | 5/2012 | Zheng | ............ | G01G 19/393 177/25.18 |

\* cited by examiner

OBJECT COLLECTING AND DISCHARGING DEVICE OF A COMBINATION WEIGHER INCLUDING FIRST THROUGH SIXTH DISCHARGE PATHS AND A COMBINATION WEIGHER USING THE SAME

TECHNICAL FIELD

The present invention relates to an object collecting and discharging device of a combination weigher and the combination weigher using the same.

BACKGROUND ART

Conventionally, there is known a collecting funnel of a combination weigher applied to a packaging machine having four object inlets which are aligned. This collecting funnel includes an annular upper opening, and first to fourth four lower discharge outlets which are aligned sequentially such that the four lower discharge outlets correspond to the four object inlets of the packaging machine, respectively. Partition walls are provided to partition the inside of the collecting funnel so that the objects discharged from weighing hoppers which are provided above the collecting funnel and divided into four groups move down through the inside of the collecting funnel and are discharged from the corresponding lower discharge outlets (see, e.g. Patent Literature 1).

CITATION LIST

Patent Literature

Patent Literature 1: Japanese-Laid Open Patent Application Publication No. 2006-112895

SUMMARY OF INVENTION

Technical Problem

For example, there is a packaging machine which is intended to improve a processing capability by increasing the number of the object inlets which are aligned, from four which was set previously, to six. Therefore, it is required that the collecting funnel of the combination weigher applied to the packaging machine be provided with six lower discharge outlets corresponding in number to the object inlets to discharge the objects (weighed objects) having a weight corresponding to a target weight from the corresponding lower discharge outlets. On the other hand, to operate the combination weigher at a high speed, it is necessary to reduce a range of distribution (range of difference) of the lengths of paths from the upper opening to the lower discharge outlets, through which the objects to be discharged from the respective lower discharge outlets move down, to a smallest possible range. However, in the collecting funnel having a circular upper opening, the range of distribution of the movement path lengths increases geometrically as the number of the lower discharge outlets which are aligned increases. For this reason, in the collecting funnel having the circular upper opening, it is not easy to increase the number of the lower discharge outlets which are aligned, from four which was set previously, to six.

The present invention has been developed to solve the above described problem, and an object is to provide an object collecting and discharging device of a combination weigher which is applicable to the packaging machine having the six object inlets while suppressing a reduction of an operation speed, as compared to the conventional example in which the four lower discharge outlets are aligned.

Solution to Problem

To solve the above described problem, an object collecting and discharging device of a combination weigher of the present invention, comprises an inner collecting chute which has a hollow truncated inverted-cone shape having a vertical center axis; an outer collecting chute which has a hollow truncated inverted-cone shape and is placed outward relative to the inner collecting chute and concentrically with the inner collecting chute; when the inner collecting chute is sequentially divided into first to eighth virtual regions (hereinafter will be referred to as first to eighth regions) so as to have a center angle which is equal in a circumferential direction, when viewed from a vertical direction, a first discharge path having a first upper opening corresponding to a half of a lower opening of the inner collecting chute, which is defined by a lower end of the inner collecting chute which is located in the first to fourth regions, and a first lower opening which is placed on a straight line extending on a boundary between the second region and the third region and a boundary between the sixth region and the seventh region when viewed from the vertical direction, and located below the first upper opening, the first discharge path extending from the first upper opening to the first lower opening; a second discharge path having a second upper opening corresponding to a lower end of the inner collecting chute which is located in the first region and a lower end of a portion of the outer collecting chute which is located outward relative to the first region of the inner collecting chute, a third upper opening corresponding to a lower end of the inner collecting chute which is located in the fourth region and a lower end of a portion of the outer collecting chute which is located outward relative to the fourth region of the inner collecting chute, and a second lower opening which is placed on the straight line on the same side as a side where the first lower opening of the first discharge path is placed with respect to the center axis and located outward relative to the first lower opening, the second discharge path extending from the second upper opening and the third upper opening to the second lower opening; a third discharge path having a fourth upper opening corresponding to a lower end of the inner collecting chute which is located in the second region and the third region and a lower end of a portion of the outer collecting chute which is located outward relative to the second region and the third region of the inner collecting chute, and a third lower opening which is placed on the straight line on the same side as a side where the second lower opening of the second discharge path is placed with respect to the center axis, and located outward relative to the second lower opening, the third discharge path extending from the fourth upper opening to the third lower opening; a fourth discharge path having a fifth upper opening corresponding to a half of the lower opening of the inner collecting chute, which is defined by a lower end of the inner collecting chute which is located in the fifth to eighth regions, and a fourth lower opening which is placed on the straight line and located below the fifth upper opening, the fourth discharge path extending from the fifth upper opening to the fourth lower opening; a fifth discharge path having a sixth upper opening corresponding to a lower end of the inner collecting chute which is located in the fifth region and a lower end of a portion of the outer collecting chute which is located outward relative to the fifth region of the inner collecting chute, a seventh upper opening corresponding to a lower end of the inner collecting chute which is located in the eighth region and a lower end of a portion of the outer collecting chute which is located outward relative to the eighth region of the inner collecting chute, and a fifth lower opening which is placed on the straight line on the same side as a side where the fourth lower opening of the fourth discharge path is placed with respect to the center axis and located outward relative to the fourth lower opening, the fifth discharge path extending from sixth upper opening and the seventh upper opening to the fifth lower opening; and a sixth discharge path having an eighth upper opening corresponding to a lower end of the inner collecting chute which is located in the sixth region and the seventh region and a lower end of a portion of the outer collecting chute which is located outward relative to the sixth region and the seventh region of the inner collecting chute, and a sixth lower opening which is placed on the straight line on the same side as a side where the fifth lower opening of the fifth discharge path is placed with respect to the center axis and located outward relative to the fifth lower opening, the sixth discharge path extending from the eighth upper opening to the sixth lower opening.

In accordance with this configuration, the objects thrown into the inner collecting chute or to the outer collecting chute can be discharged from one of the aligned first to sixth lower openings, which corresponds to the position to which the objects are thrown. In addition, it becomes possible to suppress an increase in a range of distribution (range of difference) of the lengths of paths from the first to eighth upper openings to the first to sixth lower openings, through which the objects to be discharged from the first to sixth lower openings move down, as compared to the conventional example in which the four lower discharge outlets are aligned. As a result, the object collecting and discharging device is applicable to a packaging machine having six object inlets which are aligned while suppressing a reduction of an operation speed, as compared to the conventional example in which the four lower discharge outlets are aligned.

In the object collecting and discharging device of the combination weigher, according to the above invention, the first discharge path may include a first inclined section having a hollow truncated semi-inverted-cone shape and extending downward at a first inclination angle from a portion of the first upper opening, corresponding to the lower end of the inner collecting chute which is located in the first to fourth regions; and a second inclined section extending from a lower end of the first inclined section to the first lower opening at a second inclination angle which is greater than the first inclination angle; and the fourth discharge path may include a third inclined section having a hollow truncated semi-inverted-cone shape and extending downward at the first inclination angle, from a portion of the fifth upper opening, corresponding to the lower end of the inner collecting chute which is located in the fifth to eighth regions, and a fourth inclined section extending from a lower end of the third inclined section to the fourth lower opening at the second inclination angle.

In accordance with this configuration, it becomes possible to prevent a situation in which the first discharge path gets close to or contacts the second discharge path, and therefore prevent a situation in which the second discharge path is closed or narrowed by the first discharge path. In addition, it becomes possible to prevent a situation in which the fourth discharge path gets close to or contacts the fifth discharge path, and hence prevent a situation in which the fifth discharge path is closed or narrowed by the fourth discharge path.

In the object collecting and discharging device of the combination weigher, according to the above invention, the third discharge path may be detachably locked with the second discharge path, and the sixth discharge path may be detachably locked with the fifth discharge path.

In accordance with this configuration, washing work of the third and sixth discharge paths can be carried out easily. In addition, alignment work of the third lower opening and the sixth lower opening with respect to the object inlets of the packaging machine can be carried out easily.

In the object collecting and discharging device of the combination weigher, according to the above invention, the second discharge path may include: a first guide plate extending from a portion of the second upper opening, corresponding to the lower end of the portion of the outer collecting chute which is located outward relative to the first region of the inner collecting chute, to the second lower opening; a second guide plate extending from a portion of the third upper opening, corresponding to the lower end of the portion of the outer collecting chute which is located outward relative to the fourth region of the inner collecting chute, to the second lower opening; a first connecting plate connecting a side edge of the first guide plate which is closer to the second region of the inner collecting chute to a side edge of the second guide plate which is closer to the third region of the inner collecting chute and extending such that an outer periphery of the second lower opening is a lower edge of the first connecting plate, the first connecting plate being configured such that an upper edge thereof is cut downward; a second connecting plate connecting a side edge of the first guide plate which is closer to the eighth region of the inner collecting chute to a side edge of the second guide plate which is closer to the fifth region of the inner collecting chute and extending such that an outer periphery of the second lower opening is a lower edge of the second connecting plate, the second connecting plate being configured such that both end portions of an upper edge thereof extend toward the first discharge path, and a portion between the both end portions of the upper edge is mounted to the first discharge path without a clearance; and a first mounting plate extending from an entire of the upper edge of the first connecting plate toward the first discharge path and being configured such that a tip end portion thereof is mounted to the first discharge path without a clearance; and the fifth discharge path may include: a third guide plate extending from a portion of the sixth upper opening, corresponding to the lower end of the portion of the outer collecting chute which is located outward relative to the fifth region of the inner collecting chute, to the fifth lower opening; a fourth guide plate extending from a portion of the seventh upper opening, corresponding to the lower end of the portion of the outer collecting chute which is located outward relative to the eighth region of the inner collecting chute, to the fifth lower opening; a third connecting plate connecting a side edge of the third guide plate which is closer to the fourth region of the inner collecting chute to a side edge of the fourth guide plate which is closer to the first region of the inner collecting chute when viewed from the vertical direction, and extending such that an outer periphery of the fifth lower opening is a lower edge of the third connecting plate, the third connecting plate being configured such that both end portions of an upper edge thereof extend toward the fourth discharge path, and a portion between the both end portions of the upper edge is cut downward; a fourth connecting plate extending so as to connect a side edge of the third guide plate which is closer to the sixth region of the inner collecting chute to a side edge of the fourth guide plate which is closer to the seventh region of the inner collecting chute when viewed from the vertical direction, the fourth connecting plate being configured such that an upper edge thereof is mounted to the fourth discharge path without a clearance; and a second mounting plate extending from an entire of the upper edge of the third connecting plate toward the fourth discharge path and being configured such that a tip end portion thereof is mounted to the fourth discharge path without a clearance.

In accordance with this configuration, the fifth upper opening can be located between the second upper opening and the third upper opening and the eighth upper opening can be located between the sixth upper opening and the seventh upper opening. In addition, the second discharge path can be easily mounted to the first discharge path, and the fifth discharge path can be easily mounted to the fourth discharge path.

To solve the above described problem, a combination weigher of the present invention comprises the above stated object collecting and discharging device; and a plurality of weighing hoppers which are arranged in a circular shape above a boundary between the inner collecting chute and the outer collecting chute, and each of which is configured to selectively discharge the objects held in the weighing hopper to the inner collecting chute or to the outer collecting chute.

Advantageous Effects of Invention

The present invention is configured as described above and can achieve advantages that it is possible to provide a combination weigher which is applicable to a packaging machine having six object inlets while suppressing a reduction of an operation speed, as compared to the conventional example in which four lower discharge outlets are aligned.

DESCRIPTION OF EMBODIMENTS

Hereinafter, the embodiment of the present invention will be described with reference to the drawings. Throughout the drawings, the same or corresponding components are designated by the same reference symbols and will not be described in repetition.

[Exemplary Configuration and Exemplary Operation of Combination Weigher]

A collecting and discharging device 100 of the present embodiment is incorporated into, for example, a hand-operated, semi-automatic or automatic (full-automatic) combination weigher and used. Hereinafter, a case where the collecting and discharging device 100 is incorporated into an automatic combination weigher (hereinafter will be simply referred to as "combination weigher") 1 will be exemplarily described. Hereinafter, a region which is closer to the center of the combination weigher 1 (i.e., region which is closer to the center axis of an inner collecting chute 11 as will be described later) will be referred to as "inner" or "inward".

A packaging machine to which the combination weigher 1 is applied includes six object inlets which are aligned and are provided at an equal height position.

Figure 1:
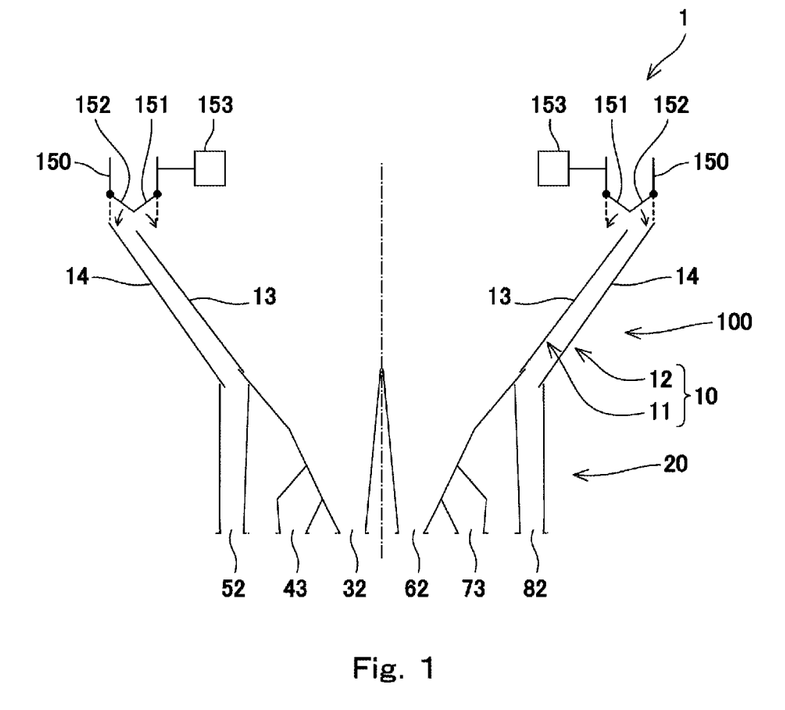
FIG. 1 is a view schematically showing the exemplary configuration of a combination weigher including an object collecting and discharging device according to an embodiment of the present invention.
Figure 2:
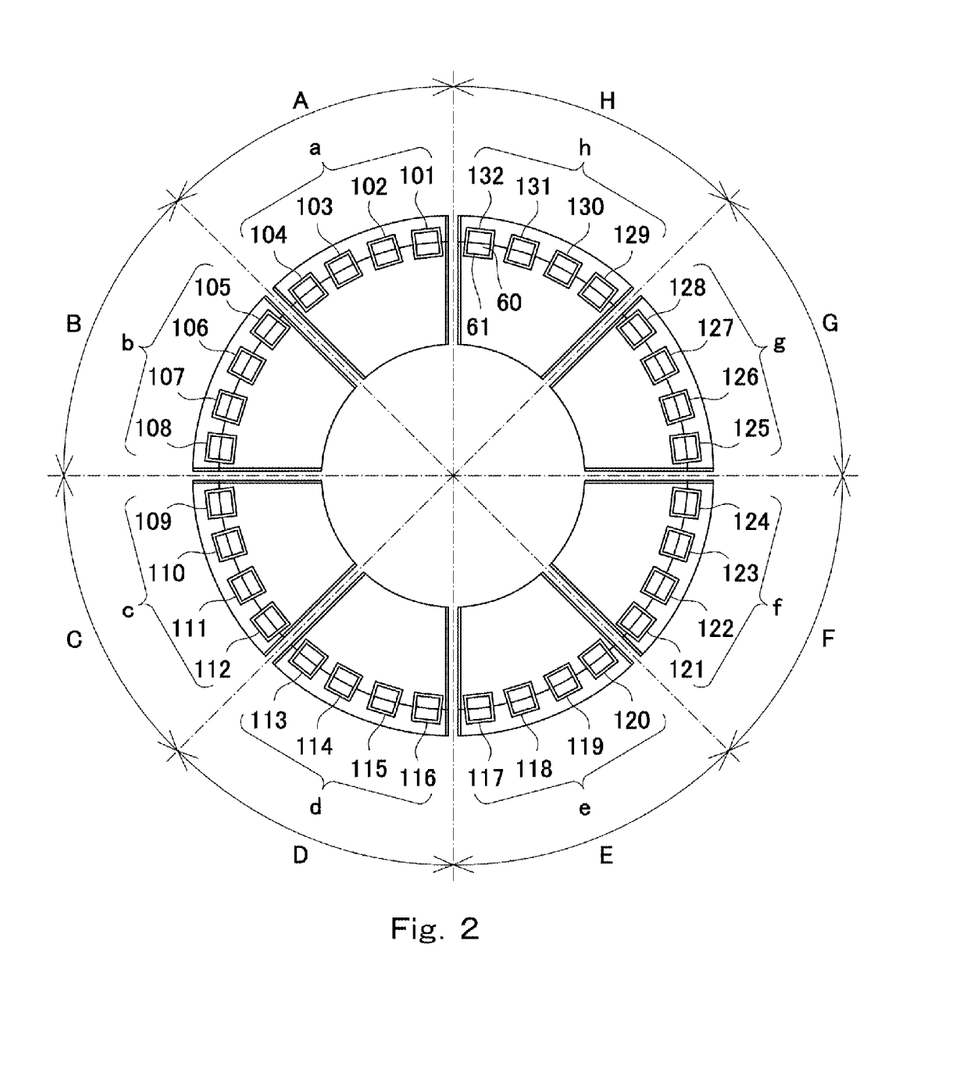
FIG. 2 is a plan view showing the exemplary configuration of weighing hoppers and a collecting chute of the combination weigher of FIG. 1.

FIG. 1 is a view schematically showing the exemplary configuration of the combination weigher 1. FIG. 2 is a plan view showing the exemplary configuration of weighing hoppers 101 to 132 and a collecting chute 10 of the combination weigher 1.

As shown in FIG. 1, the combination weigher 1 incorporating the collecting and discharging device 100 of the present embodiment includes a plurality of weighing hoppers which hold objects supplied from a known supply mechanism (not shown) of the combination weigher 1, and the collecting and discharging device 100 provided below these weighing hoppers. As shown in FIG. 2, in the present embodiment, for example, thirty two weighing hoppers are provided and are arranged in a circular shape. A weight sensor 153 detects the weight of the objects supplied to and held in each of the weighing hoppers.

When viewed from a vertical direction, the thirty two weighing hoppers 101 to 132 are divided into first to eighth groups a to h each of which is composed of four weighing hoppers. Specifically, the weighing hoppers 101 to 104 belong to the first group a, the weighing hoppers 105 to 108 belong to the second group b, the weighing hoppers 109 to 112 belong to the third group c, the weighing hoppers 113 to 116 belong to the fourth group d, the weighing hoppers 117 to 120 belong to the fifth group e, the weighing hoppers 121 to 124 belong to the sixth group f, the weighing hoppers 125 to 128 belong to the seventh group g, and the weighing hoppers 129 to 132 belong to the eighth group h.

The weighing hoppers belonging to the first to eighth groups a to h are located within eight virtual regions (hereinafter will be referred to as first to eighth regions A to H) formed by division so as to have an equal center angle in a circumferential direction when viewed from the vertical direction.

As shown in FIG. 1, each of the weighing hoppers 101 to 132 includes a tubular hopper body 150, an inner gate 151 and an outer gate 152. The inner gate 151 has a structure in which its upper end portion is supported on the hopper body 150 such that the inner gate 151 is rotatable and the inner gate 151 extends outward and obliquely downward, and is able to close the inner half portion of a lower opening of the hopper body 150. The outer gate 152 has a structure in which its upper end portion is supported on the hopper body 150 such that the outer gate 152 is rotatable and the outer gate 152 extends inward and obliquely downward, and is able to close the outer half portion of the lower opening of the hopper body 150. When the inner gate 151 is driven by a driving unit (not shown) and opened in a state in which the outer gate 152 is closed, the objects held in the hopper body 150 are discharged inward and obliquely downward. Or, when the outer gate 152 is driven by the driving unit (not shown) and opened in a state in which the inner gate 151 is closed, the objects held in the hopper body 150 are discharged outward and obliquely downward. In this way, each of the weighing hoppers 101 to 132 is configured to discharge the objects in two directions, i.e., inward and obliquely downward and outward and obliquely downward.

Next, the exemplary operation of the combination weigher 1 will be described.

A control unit (not shown) of the combination weigher 1 performs combination calculation of the weights of the objects held in the eight weighing hoppers 101 to 104 and 113 to 116 belonging to the first and fourth groups a, d, to find a first optimal combination in which its combination weight falls within a predetermined allowable error range and is equal to or closest to a target weight.

Then, the control unit performs combination calculation of the weights of the objects held in the eight weighing hoppers 105 to 112 belonging to the second and third groups b, c, to find a second optimal combination in which its combination weight falls within the predetermined allowable error range and is equal to or closest to the target weight.

Then, the control unit performs combination calculation of the weights of the objects held in the eight weighing hoppers 117 to 120 and 129 to 132 belonging to the fifth and eighth groups e, h, to find a third optimal combination in which its combination weight falls within the predetermined allowable error range and is equal to or closest to the target weight.

Then, the control unit performs combination calculation of the weights of the objects held in the eight weighing hoppers 121 to 128 belonging to the sixth and seventh groups f, g, to find a fourth optimal combination in which its combination weight falls within the predetermined allowable error range and is equal to or closest to the target weight.

Then, the control unit performs combination calculation of the weights of the objects held in the weighing hoppers among the weighing hoppers 101 to 116 belonging to the first to fourth groups a to d, which are other than the weighing hoppers holding the objects making up the first optimal combination and the weighing hoppers holding the objects making up the second optimal combination, to find a fifth optimal combination in which its combination weight falls within the predetermined allowable error range and is equal to or closest to the target weight.

Then, the control unit performs combination calculation of the weights of the objects held in the weighing hoppers among the weighing hoppers 117 to 132 belonging to the fifth to eighth groups e to h, which are other than the weighing hoppers holding the objects making up the third optimal combination and the weighing hoppers holding the objects making up the fourth optimal combination, to find a sixth optimal combination in which its combination weight falls within the predetermined allowable error range and is equal to or closest to the target weight.

Then, the control unit actuates the driving units of the weighing hoppers holding the objects making up the first to fourth optimal combinations to open the outer gates 152, thereby discharging the objects outward and obliquely downward.

Concurrently with this, the control unit actuates the driving units of the weighing hoppers holding the objects making up the fifth and sixth optimal combinations to open the inner gates 151, thereby discharging the objects inward and obliquely downward.

Then, the objects making up the first to sixth optimal combinations which are discharged from the weighing hoppers move down through the collecting and discharging device 100 and are discharged from first to sixth lower openings 32, 43, 52, 62, 73, 82 as will be described later. Then, the objects are thrown into object inlets of a packaging machine, which correspond to the lower openings, respectively, and are packaged by the packaging machine.

[Configuration of Collecting and Discharging Device]

As shown in FIG. 1, the collecting and discharging device 100 includes the collecting chute 10 which guides the objects discharged from the weighing hoppers inward and obliquely downward, collects and discharges the objects, and a discharging device 20 which collects the objects discharged from the collecting chute 10 such that the objects correspond to each of the first to sixth optimal combinations, and discharges the objects from the corresponding first to sixth lower openings 32, 43, 52, 62, 73, 82 as will be described later.

(Exemplary Configuration of Collecting Chute)

The collecting chute 10 includes an inner collecting chute 11 and an outer guide chute 12.

The inner collecting chute 11 has a hollow truncated inverted-cone shape having a vertical center axis as a whole. The center axis of the inner collecting chute 11 constitutes the center axis of the collecting and discharging device 100. As shown in FIG. 2, the inner collecting chute 11 includes eight guide plates 13 which are placed within the first to eighth regions A to H, respectively such that one guide plate 13 corresponds to one of the first to eighth regions A to H. The upper ends of the eight guide plates 13 define the upper opening of the inner collecting chute 11, while the lower ends of the eight guide plates 13 define the lower opening of the inner collecting chute 11. Each of the guide plates 13 has a tapered shape in which it extends inward and obliquely downward and its width is reduced downward. The side edge of each of the guide plates 13 is bent upward. This can prevent the objects sliding down on the guide plates 13 from popping out from the side edges of the guide plates 13. The guide plates 13 are removably mounted to a frame body (not shown). This makes it possible to easily carry out washing work of the inner collecting chute 11.

In the present embodiment, the inner collecting chute 11 includes the eight guide plates 13 which are placed within the first to eighth regions A to H, respectively such that one guide plate 13 corresponds to one of the first to eighth regions A to H. However, the present invention is not limited to this. Alternatively, for example, one guide plate 13 may be provided in the region over the first to fourth regions A to D and one guide plate 13 may be provided in the region over the fourth to eighth regions E to H, i.e., two guide plates 13 in total may be provided.

The boundary between the fourth region D and the fifth region E of the inner collecting chute 11 and the boundary between the eighth region H and the first region A of the inner collecting chute 11 are desirably partitioned so that objects sliding down on the inner collecting chute 11 do not move beyond the boundaries and are not mixed. However, the present invention is not limited to this, and these boundaries may not be partitioned as such.

The outer guide chute 12 has a hollow truncated inverted-cone shape having a vertical center axis as a whole and is placed outward relative to the inner collecting chute 11 and concentrically with the inner collecting chute 11. The outer guide chute 12 includes eight guide plates 14 which are placed within the first to eighth regions A to H, respectively such that one guide plate 14 corresponds to one of the first to eighth regions A to H. The upper ends of the eight guide plates 14 of the outer guide chute 12 and the upper ends of the eight guide plates 13 of the inner collecting chute 11 define the upper opening of the outer guide chute 12. The lower ends of the eight guide plates 14 of the outer guide chute 12 and the lower ends of the eight guide plates 13 of the inner collecting chute 11 define the lower opening of the outer guide chute 12.

Each of the guide plates 14 has a tapered shape in which it extends inward and obliquely downward and its width is reduced downward. The side edge of each of the guide plates 14 is bent upward. This can prevent the objects sliding down on the guide plates 14 from popping out from the side edges of the guide plates 14. The guide plates 14 are removably mounted to the frame body (not shown). This makes it possible to easily carry out washing work of the outer guide chute 12.

In the present embodiment, the outer guide chute 12 includes the eight guide plates 14 which are placed within the first to eighth regions A to H, respectively such that one guide plate 14 corresponds to one of the first to eighth regions A to H. However, the present invention is not limited to this. Alternatively, for example, one guide plate 14 may be provided in the first region A, one guide plate 14 may be provided in the region over the second and third regions B, C, one guide plate 14 may be provided in the fourth region D, one guide plate 14 may be provided in the fifth region E, one guide plate 14 may be provided in the region over the sixth and seventh regions F, G, and one guide plate 14 may be provided in the eighth region H, i.e., six guide plates 14 in total may be provided.

The boundary between the first region A and the second region B of the outer guide chute 12, the boundary between the third region C and the fourth region D of the outer guide chute 12, the boundary between the fourth region D and the fifth region E of the outer guide chute 12, the boundary between the fifth region E and the sixth region F of the outer guide chute 12, the boundary between the seventh region G and the eighth region H of the outer guide chute 12, and the boundary between the eighth region H and the first region A of the outer guide chute 12 are desirably partitioned so that the objects sliding down on the outer guide chute 12 do not move beyond the boundaries and are not mixed. However, the present invention is not limited to this, and these boundaries may not be partitioned as such.

As shown in FIGS. 1 and 2, the weighing hoppers 101 to 132 are placed above the upper ends of the guide plates 13 of the inner collecting chute 11. In this configuration, the objects discharged inward and obliquely downward by opening the inner gates 151 of the weighing hoppers 101 to 132 are thrown into the upper opening of the inner collecting chute 11. In contrast, the objects discharged outward and obliquely downward by opening the outer gates 152 of the weighing hoppers 101 to 132 are thrown into the upper opening of the outer guide chute 12.

[Exemplary Configuration of Discharging Device]

Figure 3:
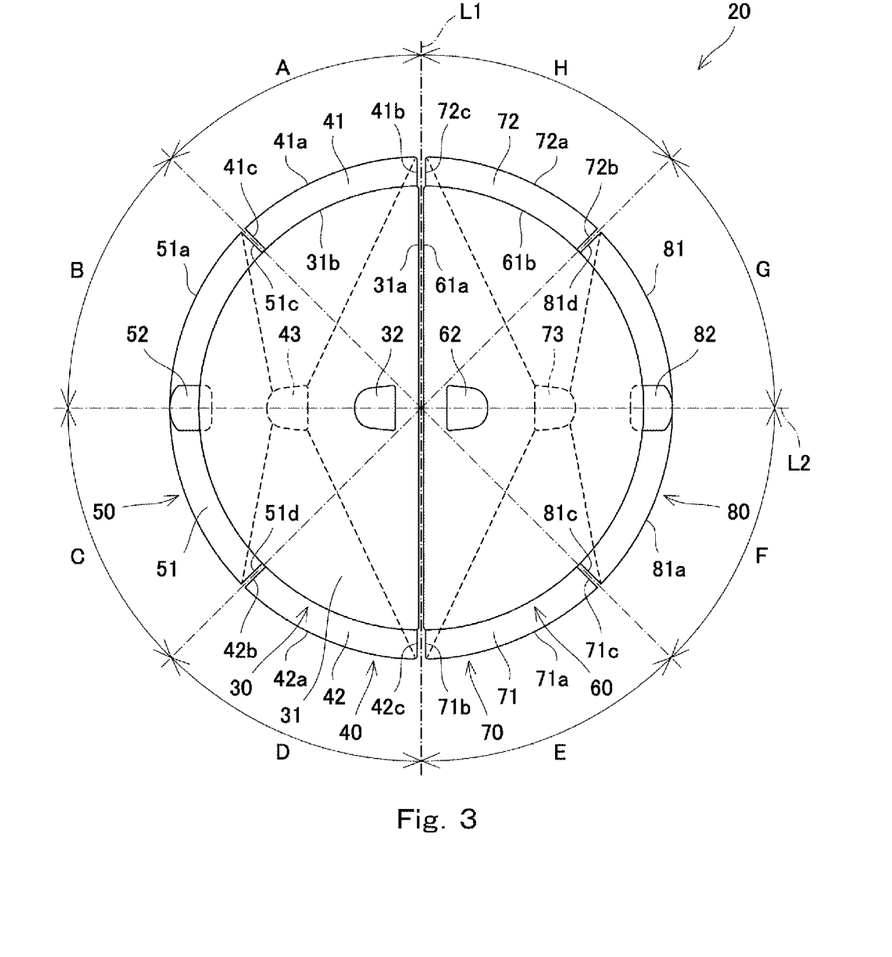
FIG. 3 is a plan view showing the exemplary configuration of a discharging device of the object collecting and discharging device of the combination weigher of FIG. 1.
Figure 4:
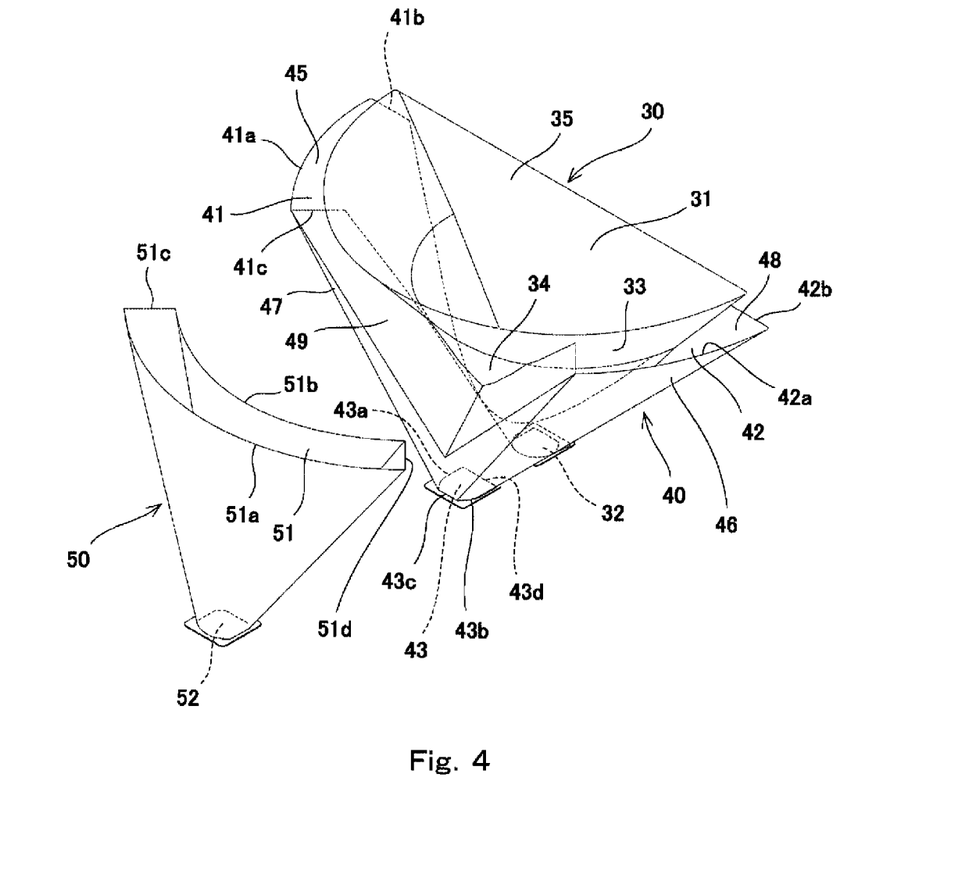
FIG. 4 is a perspective view showing the exemplary configuration of first to third discharge paths of the object collecting and discharging device of the combination weigher of FIG. 1 and is a view showing a state in which the third discharge path is detached from the first and second discharge paths.
Figure 5:
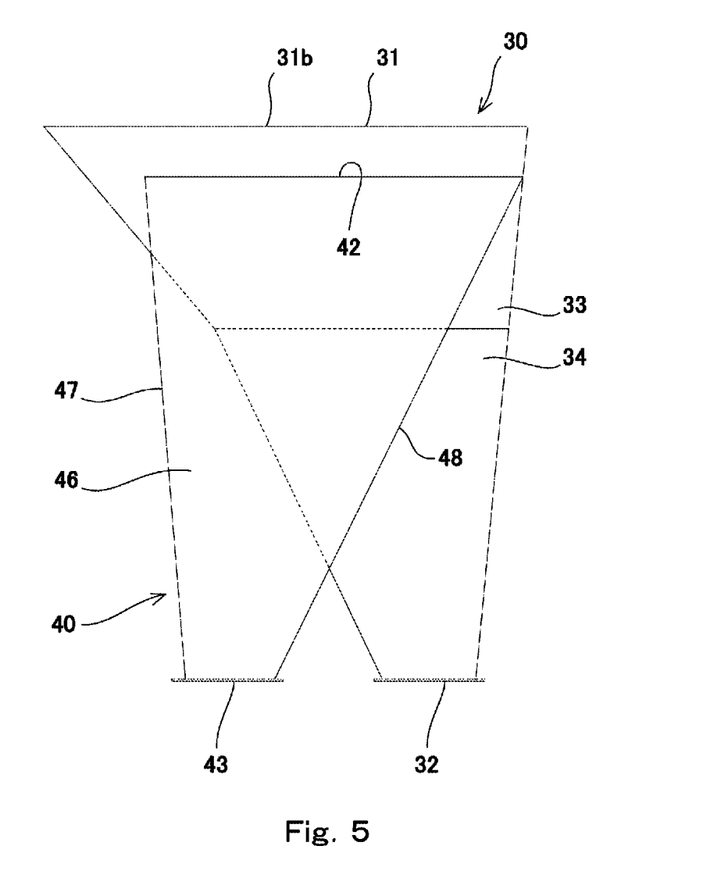
FIG. 5 is a side view showing the exemplary configuration of the first and second discharge paths of the object collecting and discharging device of the combination weigher of FIG. 1.

FIG. 3 is a plan view showing the exemplary configuration of the discharging device 20. FIG. 4 is a perspective view showing the exemplary configuration of first to third discharge paths 30, 40, 50 and is a view showing a state in which the third discharge path 50 is detached from the first and second discharge paths 30, 40. FIG. 5 is a side view showing the exemplary configuration of the first and second discharge paths 30, 40.

As shown in FIG. 3, the discharging device 20 includes first to sixth discharge paths 30, 40, 50, 60, 70, 80.

As shown in FIG. 4, the first discharge path 30 includes a first upper opening 31 and a first lower opening 32 located below the first upper opening 31 and connects the first upper opening 31 to the first lower opening 32. The first discharge path 30 has an inner space which is narrower from its upper side toward its lower side. In this configuration, the objects making up the fifth optimal combination, which are thrown into the first discharge path 30 via the first upper opening 31, are collected while sliding down in the inner space of the first discharge path 30, and are discharged from the first lower opening 32.

As shown in FIG. 3, the first upper opening 31 is located in the region over the first to fourth regions A to D and has a semi-circular shape. Specifically, the first upper opening 31 is defined by an opening edge 31a extending linearly along the boundary L1 between the first region A and the eighth region H and the boundary L1 between the fourth region D and the fifth region E, and an opening edge 31b connecting both ends of the opening edge 31a and extending through the region over the first to fourth regions A to D, in a circular-arc shape in a radial direction around the center axis of the collecting and discharging device 100, as the center. As shown in FIG. 1, the opening edge 31b extending in the circular-arc shape is located outward relative to the lower end of the inner collecting chute 11 (guide plate 13). In other words, the first upper opening 31 corresponds to a half of the lower opening of the inner collecting chute 11, which is defined by the lower ends of the guide plates 13 of the inner collecting chute 11 which are located in the first to fourth regions A to D. In this configuration, the objects making up the fifth optimal combination, which slide down on the guide plates 13 of the inner collecting chute 11 which are located in the first to fourth regions A to D, are thrown into the first discharge path 30 via the first upper opening 31.

As shown in FIG. 3, the first lower opening 32 has a substantially rectangular shape and is placed on a straight line L2 extending on the boundary between the second region B and the third region C and the boundary between the sixth region F and the seventh region G, when viewed from the vertical direction.

As shown in FIGS. 4 and 5, the first discharge path 30 includes a first inclined section 33 having a hollow truncated semi-inverted-cone shape and extending such that it is inclined downward from the opening edge 31b of the first upper opening 31, extending in the circular-arc shape, a second inclined section 34 extending from the lower end of the first inclined section 33 such that it is inclined, and a connecting section 35 connecting the both side edges of the first inclined section 33 to the both side edges of the second inclined section 34. The inclination angle (second inclination angle) of the second inclined section 34 is set greater than the inclination angle (first inclination angle) of the first inclined section 33.

As shown in FIG. 4, the second discharge path 40 includes a second upper opening 41, a third upper opening 42, and a second lower opening 43 which is located below the second upper opening 41 and the third upper opening 42, and connects the second upper opening 41 and the third upper opening 42 to the second lower opening 43. In this configuration, the objects making up the first optimal combination which are thrown into the second upper opening 41 and the third upper opening 42 are joined together and collected while sliding down in the inner space of the second discharge path 40, and are discharged from the second lower opening 43.

As shown in FIG. 3, the second upper opening 41 is located in the first region A and outward relative to the first discharge path 30 and has a sector shape. Specifically, the second upper opening 41 is defined by an opening edge 41a extending in the circular-arc shape in the radial direction around the center axis of the collecting and discharging device 100, as the center, in the first region A, opening edges 41b, 41c extending linearly from both ends of the opening edge 41a toward the center axis of the collecting and discharging device 100, in the first region A, and the outer side surface of the first discharge path 30 corresponding to the lower end of the inner collecting chute 11 (guide plate 13), in the first region A. As shown in FIG. 1, the opening edge 41a extending in the circular-arc shape is located outward relative to the lower end of the outer guide chute 12 (guide plate 14). That is, the second upper opening 41 corresponds to the lower end of the guide plate 13 of the inner collecting chute 11 which is located in the first region A and the lower end of the guide plate 14 of the outer guide chute 12 which is located in the first region A. In this configuration, the objects making up the first optimal combination, which slide down on the guide plate 14 of the outer guide chute 12 which is located in the first region A, are thrown into the second discharge path 40 via the second upper opening 41.

As shown in FIG. 3, the third upper opening 42 is located in the fourth region D and outward relative to the first discharge path 30 and has a sector shape. Specifically, the third upper opening 42 is defined by an opening edge 42a extending in the circular-arc shape in the radial direction around the center axis of the collecting and discharging device 100, as the center, in the fourth region D, opening edges 42b, 42c extending linearly from both ends of the opening edge 42a toward the center axis of the collecting and discharging device 100, in the fourth region D, and the outer side surface of the first discharge path 30 corresponding to the lower end of the inner collecting chute 11 (guide plate 13), in the fourth region D. As shown in FIG. 1, the opening edge 42a extending in the circular-arc shape is located outward relative to the lower end of the outer guide chute 12 (guide plate 14). That is, the third upper opening 42 corresponds to the lower end of the guide plate 13 of the inner collecting chute 11 which is located in the fourth region D and the lower end of the guide plate 14 of the outer guide chute 12 which is located in the fourth region D. In this configuration, the objects making up the first optimal combination, which slide down on the guide plate 14 of the outer guide chute 12 which is located in the fourth region D, are thrown into the second discharge path 40 via the third upper opening 42.

As shown in FIG. 3, the second lower opening 43 has a substantially rectangular shape. As shown in FIG. 3, the second lower opening 43 is placed on the straight line L2, on the same side as the side where the first lower opening 32 is placed with respect to the center axis of the collecting and discharging device 100, and located outward relative to the first lower opening 32, when viewed from the vertical direction.

As shown in FIG. 4, the second discharge path 40 includes a first guide plate 45, a second guide plate 46, a first connecting plate 47, a second connecting plate 48 and a first mounting plate 49.

The first guide plate 45 extends from the opening edge 41a of the second upper opening 41, extending in the circular-arc shape, to an opening edge 43a of the second lower opening 43, which is closer to the first region A.

The second guide plate 46 extends from the opening edge 42a of the third upper opening 42, extending in the circular-arc shape, to an opening edge 43b of the second lower opening 43, which is closer to the fourth region D.

The first connecting plate 47 connects the side edge of the first guide plate 45 which is closer to the second region B to the side edge of the second guide plate 46 which is closer to the third region C and extends such that an opening edge 43c of the second lower opening 43 which is on an outer side (opposite side of a position where the first discharge path 30 is located) is the lower edge of the first connecting plate 47. The upper edge of the first connecting plate 47 is cut downward in a V-shape to a portion in the vicinity of its lower edge.

The second connecting plate 48 connects the side edge of the first guide plate 45 which is closer to the eighth region H to the side edge of the second guide plate 46 which is closer to the fifth region E, and extends such that an opening edge 43d of the second lower opening 43 which is on an inner side (side where the first discharge path 30 is located) is the lower edge of the second connecting plate 48. Both end portions of the upper edge of the second connecting plate 48 extend toward the first discharge path 30, and a portion of the second connecting plate 48 which is between the both end portions of the upper edge are mounted to the first discharge path 30 without a clearance. In the present embodiment, the second connecting plate 48 is joined to the first discharge path 30 by welding.

The first mounting plate 49 extends from the entire upper edge of the first connecting plate 47 toward the first discharge path 30 and its tip end portion is mounted to the first discharge path 30 without a clearance. In the present embodiment, the first mounting plate 49 is joined to the first discharge path 30 by welding.

As should be understood from the above, the second discharge path 40 is integrally mounted to the first discharge path 30. However, the present invention is not limited to this. Alternatively, the second discharge path 40 and the first discharge path 30 may be separate from each other. In this case, a portion of the wall defining the second discharge path 40, which portion is also a portion of the wall defining the first discharge path 30, may be formed as the wall for the second discharge path 40 and the wall for the first discharge path 30.

As described above, in the first discharge path 30, the inclination angle of the second inclined section 34 is set greater than the inclination angle of the first inclined section 33. In this configuration, it becomes possible to prevent the outer side surface of the first discharge path 30 from getting close to or contacting the first guide plate 45 and the second guide plate 46 of the second discharge path 40. Therefore, the second discharge path 40 is not closed or narrowed by the outer side surface of the first discharge path 30. This makes it possible to prevent a situation in which the objects making up the first optimal combination get stuck in the outer side surface of the first discharge path 30 within the second discharge path 40 and these objects are not discharged or it takes time to discharge these objects.

As shown in FIG. 4, the third discharge path 50 includes a fourth upper opening 51 and a third lower opening 52 which is located below the fourth upper opening 51, and connects the fourth upper opening 51 to the third lower opening 52. The third discharge path 50 has an inner space which is narrower from its upper side toward its lower side. In this configuration, the objects making up the second optimal combination which are thrown into the third discharge path 50 via the fourth upper opening 51 are collected while sliding down in the inner space of the third discharge path 50, and are discharged from the third lower opening 52.

As shown in FIGS. 3 and 4, the fourth upper opening 51 is located in the region over the second and third regions B, C, and outward relative to the first discharge path 30, and has a sector shape. Specifically, the fourth upper opening 51 is defined by an outer opening edge 51a extending in the circular-arc shape in the radial direction around the center axis of the collecting and discharging device 100, as the center, in the region over the second and third regions B, C, an inner opening edge 51b which is located inward relative the outer opening edge 51a and extends in the circular-arc shape in the radial direction around the center axis of the collecting and discharging device 100, as the center, in the region over the second and third regions B, C, an opening edge 51c which extends linearly and connects the end portion of the outer opening edge 51a which is closer to the first region A to the end portion of the inner opening edge 51b which is closer to the first region A, and an opening edge 51d which extends linearly and connects the end portion of the outer opening edge 51a which is closer to the fourth region D to the end portion of the inner opening edge 51b which is closer to the fourth region D. The inner opening edge 51b is located outward relative to the lower end of the inner collecting chute 11 (guide plate 13), and the outer opening edge 51a is located outward relative to the lower end of the outer guide chute 12 (guide plate 14). In other words, the fourth upper opening 51 corresponds to the lower ends of the guide plates 13 of the inner collecting chute 11 which are located in the second and third regions B, C, and the lower ends of the guide plates 14 of the outer guide chute 12 which are located in the second and third regions B, C. In this configuration, the objects making up the second optimal combination, which slide down on the guide plates 14 of the outer guide chute 12 which are located in the second and third regions B, C, are thrown into the third discharge path 50 via the fourth upper opening 51.

As described above, the upper edge of the first connecting plate 47 of the second discharge path 40 is cut downward in a V-shape to a portion in the vicinity of its lower edge, and the first mounting plate 49 extending from the entire upper edge of the first connecting plate 47 toward the first discharge path 30 connects the first discharge path 30 to the first connecting plate 47. Thus, it becomes possible to prevent the first connecting plate 47 and the third discharge path 50 from interfering with each other and locate the fourth upper opening 51 between the second upper opening 41 and the third upper opening 42. In addition, it becomes possible to easily mount the second discharge path 40 to the first discharge path 30.

As shown in FIG. 3, the second lower opening 52 has a substantially rectangular shape and is placed on the straight line L2, on the same side as the side where the second lower opening 43 is placed with respect to the center axis of the collecting and discharging device 100, and located outward relative to the second lower opening 43, when viewed from the vertical direction.

The third discharge path 50 is detachably locked with the second discharge path 40 by means of a lock member (not shown). This enables the third discharge path 50 to be detached from the second discharge path 40 and washed. Thus, washing work of the third discharge path 50 can be carried out easily. In addition, alignment work of the third lower opening 52 with respect to the object inlet of the packaging machine can be carried out easily.

Figure 6:
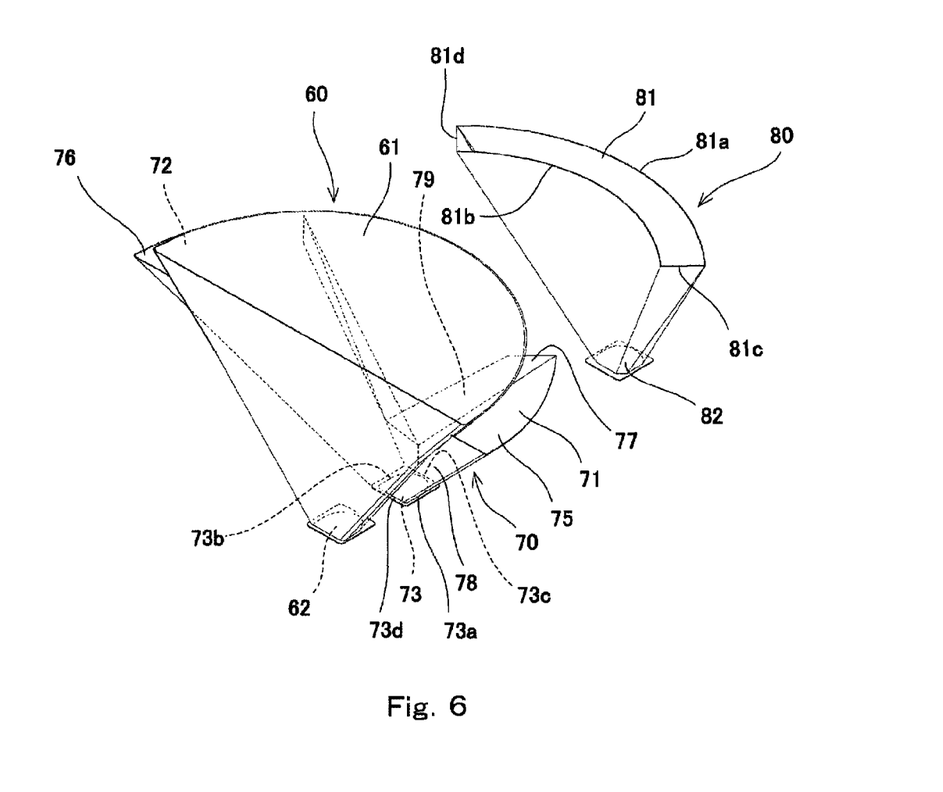
FIG. 6 is a perspective view showing the exemplary configuration of fourth to sixth discharge paths of the object collecting and discharging device of the combination weigher of FIG. 1 and is a view showing a state in which the sixth discharge path is detached from the fourth and fifth discharge paths.

FIG. 6 is a perspective view showing the exemplary configuration of the fourth to sixth discharge paths 60, 70, 80.

As shown in FIGS. 3, 4, and 6, the fourth to sixth discharge paths 60, 70, 80 are symmetric in a mirror image with the first to third discharge paths 30, 40, 50. Specifically, as shown in FIG. 6, the fourth discharge path 60 includes a fifth upper opening 61 and a fourth lower opening 62 located below the fifth upper opening 61, and connects the fifth upper opening 61 to the fourth lower opening 62. The fourth discharge path 60 has an inner space which is narrower from its upper side toward its lower side. In this configuration, the objects making up the sixth optimal combination which are thrown into the fourth discharge path 60 via the fifth upper opening 61 are collected while sliding down in the inner space of the fourth discharge path 60, and are discharged from the fourth lower opening 62.

As shown in FIG. 3, the fifth upper opening 61 is located in the region over the fifth to eighth regions E to H and has a semi-circular shape. Specifically, the fifth upper opening 61 is defined by an opening edge 61a extending linearly along the boundary L1 and an opening edge 61b connecting both ends of the opening edge 61a and extending through the region over the fifth to eighth regions E to H, in the circular-arc shape in the radial direction around the center axis of the collecting and discharging device 100, as the center. As shown in FIG. 1, the opening edge 61b extending in the circular-arc shape is located outward relative to the lower end of the inner collecting chute 11 (guide plate 13). In other words, the fifth upper opening 61 corresponds to a half of the lower opening of the inner collecting chute 11, which is defined by the lower ends of the guide plates 13 of the inner collecting chute 11 which are located in the fifth to eighth regions E to H. In this configuration, the objects making up the sixth optimal combination, which slide down on the guide plates 13 of the inner collecting chute 11 which are located in the fifth to eighth regions E to H, are thrown into the fourth discharge path 60 via the fifth upper opening 61.

As shown in FIG. 3, the fourth lower opening 62 has a substantially rectangular shape and is placed on the straight line L2, when viewed from the vertical direction.

The fourth discharge path 60 includes a third inclined section 63 having a hollow truncated semi-inverted-cone shape and extending such that it is inclined downward from the opening edge 61b of the fifth upper opening 61, extending in the circular-arc shape, a fourth inclined section 64 extending from the lower end of the third inclined section 63 such that it is inclined, and a connecting section 65 connecting the side edge of the third inclined section 63 to the side edge of the fourth inclined section 64. The inclination angle (angle equal to the second inclination angle) of the fourth inclined section 64 is set greater than the inclination angle (angle equal to the first inclination angle) of the third inclined section 63.

As shown in FIG. 6, the fifth discharge path 70 includes a sixth upper opening 71, a seventh upper opening 72, and a fifth lower opening 73 located below the sixth upper opening 71 and the seventh upper opening 72, and connects the sixth upper opening 71 and the seventh upper opening 72 to the fifth lower opening 73. In this configuration, the objects making up the third optimal combination which are thrown into the sixth upper opening 71 and the seventh upper opening 72 are joined together and collected while sliding down in the inner space of the fifth discharge path 70, and are discharged from the fifth lower opening 73.

As shown in FIG. 3, the sixth upper opening 71 is located in the fifth region E and outward relative to the first discharge path 30 and has a sector shape. Specifically, the sixth upper opening 71 is defined by an opening edge 71a extending in the circular-arc shape in the radial direction around the center axis of the collecting and discharging device 100, as the center, in the fifth region E, opening edges 71b, 71c extending linearly from both ends of the opening edge 71a toward the center axis of the collecting and discharging device 100, in the fifth region E, and the outer side surface of the fourth discharge path 60 corresponding to the lower end of the inner collecting chute 11 (guide plate 13), in the fifth region E. As shown in FIG. 1, the opening edge 71a extending in the circular-arc shape is located outward relative to the lower end of the outer guide chute 12 (guide plate 14). That is, the sixth upper opening 71 corresponds to the lower end of the guide plate 13 of the inner collecting chute 11 which is located in the fifth region E and the lower end of the guide plate 14 of the outer guide chute 12 which is located in the fifth region E. In this configuration, the objects making up the third optimal combination, which slide down on the guide plate 14 of the outer guide chute 12 which is located in the fifth region E, are thrown into the fifth discharge path 70 via the sixth upper opening 71.

As shown in FIG. 3, the seventh upper opening 72 is located in the eighth region H and outward relative to the fourth discharge path 60 and has a sector shape. Specifically, the seventh upper opening 72 is defined by an opening edge 72a extending in the circular-arc shape in the radial direction around the center axis of the collecting and discharging device 100, as the center, in the eighth region H, opening edges 72b, 72c extending linearly from both ends of the opening edge 72a toward the center axis of the collecting and discharging device 100, in the eighth region H, and the outer side surface of the fourth discharge path 60 corresponding to the lower end of the inner collecting chute 11 (guide plate 13), in the eighth region H. As shown in FIG. 1, the opening edge 72a extending in the circular-arc shape is located outward relative to the lower end of the outer guide chute 12 (guide plate 14). That is, the seventh upper opening 72 corresponds to the lower end of the guide plate 13 of the inner collecting chute 11 which is located in the eighth region H and the lower end of the guide plate 14 of the outer guide chute 12 which is located in the eighth region H. In this configuration, the objects making up the third optimal combination, which slide down on the guide plate 14 of the outer guide chute 12 which is located in the eighth region H, are thrown into the fifth discharge path 70 via the seventh upper opening 72.

As shown in FIG. 3, the fifth lower opening 73 has a substantially rectangular shape. As shown in FIG. 3, the fifth lower opening 73 is placed on the straight line L2, on the same side as the side where the fourth lower opening 62 is placed with respect to the center axis of the collecting and discharging device 100, and located outward relative to the fourth lower opening 62, when viewed from the vertical direction.

As shown in FIG. 6, the fifth discharge path 70 includes a third guide plate 75, a fourth guide plate 76, a third connecting plate 77, a fourth connecting plate 78 and a second mounting plate 79.

The third guide plate 75 extends from the opening edge 71a of the sixth upper opening 71, extending in the circular-arc shape, to an opening edge 73a of the fifth lower opening 73, which is closer to the fifth region E.

The fourth guide plate 76 extends from the opening edge 72a of the seventh upper opening 72, extending in the circular-arc shape, to an opening edge 73b of the fifth lower opening 73, which is closer to the eighth region H.

The third connecting plate 77 connects the side edge of the third guide plate 75 which is closer to the sixth region F to the side edge of the fourth guide plate 76 which is closer to the seventh region G and extends such that an opening edge 73c of the fifth lower opening 73 which is on an outer side (opposite side of a position where the fourth discharge path 60 is located) is the lower edge of the third connecting plate 77. The upper edge of the third connecting plate 77 is cut downward in a V-shape to a portion in the vicinity of its lower edge.

The fourth connecting plate 78 connects the side edge of the third guide plate 75 which is closer to the fourth region D to the side edge of the fourth guide plate 76 which is closer to the first region A and extends such that an opening edge 73d of the fifth lower opening 73 which is on an inner side (side where the fourth discharge path 60 is located) is the lower edge of the fourth connecting plate 78. Both end portions of the upper edge of the fourth connecting plate 78 extend toward the fourth discharge path 60, and a portion of the fourth connecting plate 78 which is between the both end portions of the upper edge is mounted to the fourth discharge path 60 without a clearance. In the present embodiment, the fourth connecting plate 78 is joined to the fourth discharge path 60 by welding.

The second mounting plate 79 extends from the entire upper edge of the third connecting plate 77 toward the first discharge path 30 and its tip end portion is mounted to the first discharge path 30 without a clearance. In the present embodiment, the second mounting plate 79 is joined to the fourth discharge path 60 by welding.

As should be understood from the above, the fifth discharge path 70 is integrally mounted to the fourth discharge path 60. However, the present invention is not limited to this. Alternatively, the fifth discharge path 70 and the fourth discharge path 60 may be separate from each other. In this case, a portion of the wall defining the fourth discharge path 60, which portion is also a portion of the wall defining the fifth discharge path 70, may be formed as the wall for the fourth discharge path 60 and the wall for the fifth discharge path 70.

As described above, the inclination angle of the fourth inclined section 64 of the fourth discharge path 60 is set greater than the inclination angle of the third inclined section 63. Therefore, it becomes possible to prevent the outer side surface of the fourth discharge path 60 from getting close to or contacting the third guide plate 75 and the fourth guide plate 76 of the fifth discharge path 70. Therefore, the fifth discharge path 70 is not closed or narrowed by the outer side surface of the fourth discharge path 60. This makes it possible to prevent a situation in which the objects making up the third optimal combination get stuck in the outer side surface of the fourth discharge path 60 within the fifth discharge path 70 and these objects are not discharged or it takes time to discharge these objects.

As shown in FIG. 6, the sixth discharge path 80 includes an eighth upper opening 81, and a sixth lower opening 82 which is located below the eighth upper opening 81, and connects the eighth upper opening 81 to the sixth lower opening 82. The sixth discharge path 80 has an inner space which is narrower from its upper side toward its lower side. In this configuration, the objects making up the fourth optimal combination which are thrown into the sixth discharge path 80 via the eighth upper opening 81 are collected while sliding down in the inner space of the sixth discharge path 80, and are discharged from the sixth lower opening 82.

As shown in FIGS. 3 and 6, the eighth upper opening 81 is located in the region over the sixth and seventh regions F, G, and outward relative to the fourth discharge path 60, and has a sector shape. Specifically, the eighth upper opening 81 is defined by an outer opening edge 81a extending in the circular-arc shape in the radial direction around the center axis of the collecting and discharging device 100, as the center, in the region over the sixth and seventh regions F, G, an inner opening edge 81b which is located inward relative to the outer opening edge 81a and extends in the circular-arc shape in the radial direction around the center axis of the collecting and discharging device 100, as the center, in the region over the sixth and seventh regions F, G, an opening edge 81c which extends linearly and connects the end portion of the outer opening edge 81a which is closer to the fifth region E to the end portion of the inner opening edge 81b which is closer to the fifth region E, in the region over the sixth and seventh regions F, G, and an opening edge 81d which extends linearly and connects the end portion of the outer opening edge 81a which is closer to the eighth region H to the end portion of the inner opening edge 81b which is closer to the eighth region H, in the region over the sixth and seventh regions F, G. The inner opening edge 81b is located outward relative to the lower end of the inner collecting chute 11 (guide plate 13), and the outer opening edge 81a is located outward relative to the lower end of the outer guide chute 12 (guide plate 14). In other words, the eighth upper opening 81 corresponds to the lower ends of the guide plates 13 of the inner collecting chute 11 which are located in the sixth and seventh regions F, G, and the lower ends of the guide plates 14 of the outer guide chute 12 which are located in the sixth and seventh regions F, G. In this configuration, the objects making up the fourth optimal combination, which slide down on the guide plates 14 of the outer guide chute 12 which are located in the sixth and seventh regions F, G, are thrown into the sixth discharge path 80 via the eighth upper opening 81.

As described above, the upper edge of the third connecting plate 77 of the fifth discharge path 70 is cut downward in a V-shape to a portion in the vicinity of its lower edge, and the second mounting plate 79 extending from the entire upper edge toward the fourth discharge path 60 connects the fourth discharge path 60 to the third connecting plate 77. Thus, it becomes possible to prevent the third connecting plate 77 and the sixth discharge path 80 from interfering with each other and locate the eighth upper opening 81 between the sixth upper opening 71 and the seventh upper opening 72. In addition, it becomes possible to easily mount the fifth discharge path 70 to the fourth discharge path 60.

As shown in FIG. 3, the sixth lower opening 82 has a substantially rectangular shape and is placed on the straight line L2, on the same side as the side where the fifth lower opening 73 is placed with respect to the center axis of the collecting and discharging device 100, and located outward relative to the fifth lower opening 73, when viewed from the vertical direction.

The sixth discharge path 80 is detachably locked with the fourth discharge path 60 by means of a lock member (not shown). This enables the sixth discharge path 80 to be detached from the fifth discharge path 70 and washed. Thus, washing work of the sixth discharge path 80 can be carried out easily. In addition, alignment work of the sixth lower opening 82 with respect to the object inlet of the packaging machine can be carried out easily.

The collecting and discharging device 100 is configured such that the distances of the paths from the upper opening of the inner collecting chute 11 or the outer guide chute 12 to the lower openings of the first to sixth discharge paths 10, 20, 30, 40, 50, 60, through which the objects making up the first to sixth optimal combinations move down, are set substantially equal. This enables the objects making up the six optimal combinations which are thrown into the upper opening of the inner collecting chute 11 or the outer guide chute 12 to be discharged from the first to sixth lower openings 32, 43, 52, 62, 73, 82, almost at the same time.

Although the first to sixth lower openings 32, 43, 52, 62, 73, 82 are provided at an equal height position, the present invention is not limited to this.

[Exemplary Use]

The objects making up the first optimal combination which are discharged from the outer gates 152 of the eight weighing hoppers 101 to 104 and 113 to 116 belonging to the first and fourth groups a, d, are thrown into the upper opening of the outer guide chute 12, slide down on the guide plates 14 located in the first and fourth regions A, D, and are thrown into the second discharge path 40 via the second and third upper openings 41, 42. Then, the objects making up the first optimal combination are joined together and collected while sliding down in the inner space of the second discharge path 40, and are discharged from the second lower opening 43.

The objects making up the second optimal combination which are discharged from the outer gates 152 of the eight weighing hoppers 105 to 112 belonging to the second and third groups b, c, are thrown into the upper opening of the outer guide chute 12, slide down on the guide plates 14 located in the second and third regions B, C, and are thrown into the third discharge path 50 via the fourth upper opening 51. Then, the objects making up the second optimal combination are collected while sliding down in the inner space of the third discharge path 50, and are discharged from the third lower opening 52.

The objects making up the third optimal combination which are discharged from the outer gates 152 of the eight weighing hoppers 117 to 120 and 129 to 132 belonging to the fifth and eighth groups e, h, are thrown into the upper opening of the outer guide chute 12, slide down on the guide plates 14 located in the fifth and eighth regions E, H, and are thrown into the fifth discharge path 70 via the sixth and seventh upper openings 71, 72. Then, the objects making up the third optimal combination are joined together and collected while sliding down in the inner space of the fifth discharge path 70, and are discharged from the fifth lower opening 73.

The objects making up the fourth optimal combination which are discharged from the outer gates 152 of the eight weighing hoppers 121 to 128 belonging to the sixth and seventh groups f, g, are thrown into the upper opening of the outer guide chute 12, slide down on the guide plates 14 located in the sixth and seventh regions F, G, and are thrown into the sixth discharge path 80 via the eighth upper opening 81. Then, the objects making up the fourth optimal combination are collected while sliding down in the inner space of the sixth discharge path 80, and are discharged from the sixth lower opening 82.

The objects making up the fifth optimal combination which are discharged from the inner gates 151 of the weighing hoppers 101 to 116 belonging to the first to fourth groups a to d, are thrown into the upper opening of the inner collecting chute 11, slide down on the guide plates 13 located in the first to fourth regions A to D, and are thrown into the first discharge path 30 via the first upper opening 31. Then, the objects making up the fifth optimal combination are collected while sliding down in the inner space of the first discharge path 30, and are discharged from the first lower opening 32.

The objects making up the sixth optimal combination which are discharged from the inner gates 151 of the weighing hoppers 117 to 132 belonging to the fifth to eighth groups e to h, are thrown into the upper opening of the inner collecting chute 11, slide down on the guide plates 13 located in the fifth to eighth regions E to H, and are thrown into the fourth discharge path 60 via the fifth upper opening 61. Then, the objects making up the sixth optimal combination are collected while sliding down in the inner space of the fourth discharge path 60, and are discharged from the fourth lower opening 62.

Each of the weighing hoppers 101 to 132 includes the inner gate 151 and the outer gate 152 and is able to selectively discharge the objects to the inner collecting chute 11 or to the outer guide chute 12. Therefore, the combination weigher 1 can be configured compactly.

As described above, in accordance with the collecting and discharging device 100 of the present embodiment, the objects discharged from the weighing hoppers slide down on the guide plates 13 or the guide plates 14 which are located in the first to eighth regions A to H, move through the corresponding one of the first to sixth discharge paths 30, 40, 50, 60, 70, 80, and can be discharged from the corresponding one of the first to sixth lower openings 32, 43, 52, 62, 73, 82, which are aligned. In addition, it becomes possible to suppress an increase in a range of distribution (range of difference) of the lengths of the paths from the first to eighth upper openings 31, 41, 42, 51, 61, 71, 72, 81 to the first to sixth lower openings 32, 43, 52, 62, 73, 82, through which the objects to be discharged from the first to sixth lower openings 32, 43, 52, 62, 73, 82 move down, as compared to the conventional example in which the four lower discharge outlets are aligned. As a result, the collecting and discharging device 100 is applicable to the packaging machine having the six object inlets which are aligned while suppressing a reduction of an operation speed, as compared to the conventional example in which the four lower discharge outlets are aligned.

<Modified Example>

Although in the present embodiment, the first to sixth lower openings 32, 43, 52, 62, 73, 82 have a substantially rectangular shape, the present invention is not limited to this. The lower openings may have a desired shape. For example, the lower openings may have a circular shape or an oval shape.

In addition, in the present embodiment, the objects are directly discharged from the weighing hoppers to the inner collecting chute 11 or to the outer guide chute 12. However, the present invention is not limited to this. Alternatively, a portion of the objects may be discharged via memory hoppers to the inner collecting chute 11 or to the outer guide chute 12.

Furthermore, the collecting and discharging device 100 may be constructed as one component in which the collecting chute 10 and the discharging device 20 are integrally joined to each other.

Although in the present embodiment, the example in which the thirty two weighing hoppers 101 to 132 are divided into the first to eighth groups a to h each of which is composed of the four weighing hoppers has been described above, the present invention is not limited to this. The number of weighing hoppers belonging to each group may be decided as desired so long as a combination weight is not negatively affected.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

An object collecting and discharging device of a combination weigher of the present invention is effectively applicable to the combination weigher.

REFERENCE SIGNS LIST

1 combination weigher
10 collecting chute
11 inner collecting chute
12 outer guide chute
13 guide plate
14 guide plate
20 discharging device
30 first discharge path
31 first upper opening
32 first lower opening
33 first inclined section
34 second inclined section
35 connecting section
40 second discharge path
41 second upper opening
42 third upper opening
43 second lower opening
45 first guide plate
46 second guide plate
47 first connecting plate
48 second connecting plate
49 first mounting plate
50 third discharge path
51 fourth upper opening
52 third lower opening
60 fourth discharge path
61 fifth upper opening
62 fourth lower opening
63 third inclined section
64 fourth inclined section
65 connecting section
70 fifth discharge path
71 sixth upper opening
72 seventh upper opening
73 fifth lower opening
75 third guide plate
76 fourth guide plate
77 third connecting plate
78 fourth connecting plate
79 second mounting plate
80 sixth discharge path
81 eighth upper opening
82 sixth lower opening
100 collecting and discharging device

The invention claimed is:

1. An object collecting and discharging device of a combination weigher including first through sixth discharge paths, comprising:

an inner collecting chute which has a hollow truncated inverted-cone shape having a vertical center axis;

an outer collecting chute which has a hollow truncated inverted-cone shape and is placed outward relative to the inner collecting chute and concentrically with the inner collecting chute;

wherein the inner collecting chute is sequentially divided into virtual first to eighth regions so as to have a center angle which is equal in a circumferential direction, when viewed from a vertical direction, a first discharge path having a first upper opening corresponding to a half of a lower opening of the inner collecting chute, which is defined by a lower end of the inner collecting chute which is located in the first to fourth regions, and a first lower opening which is placed on a straight line extending on a boundary between the second region and the third region and a boundary between the sixth region and the seventh region when viewed from the vertical direction, and located below the first upper opening, the first discharge path extending from the first upper opening to the first lower opening;

a second discharge path having a second upper opening corresponding to a lower end of the inner collecting chute which is located in the first region and a lower end of a portion of the outer collecting chute which is located outward relative to the first region of the inner collecting chute, a third upper opening corresponding to a lower end of the inner collecting chute which is located in the fourth region and a lower end of a portion of the outer collecting chute which is located outward relative to the fourth region of the inner collecting chute, and a second lower opening which is placed on the straight line on the same side as a side where the first lower opening of the first discharge path is placed with respect to the center axis and located outward relative to the first lower opening, the second discharge path extending from the second upper opening and the third upper opening to the second lower opening;

a third discharge path having a fourth upper opening corresponding to a lower end of the inner collecting chute which is located in the second region and the third region and a lower end of a portion of the outer collecting chute which is located outward relative to the second region and the third region of the inner collecting chute, and a third lower opening which is placed on the straight line on the same side as a side where the second lower opening of the second discharge path is placed with respect to the center axis, and located outward relative to the second lower opening, the third discharge path extending from the fourth upper opening to the third lower opening;

a fourth discharge path having a fifth upper opening corresponding to a half of the lower opening of the inner collecting chute, which is defined by a lower end of the inner collecting chute which is located in the fifth to eighth regions, and a fourth lower opening which is placed on the straight line and located below the fifth upper opening, the fourth discharge path extending from the fifth upper opening to the fourth lower opening;

a fifth discharge path having a sixth upper opening corresponding to a lower end of the inner collecting chute which is located in the fifth region and a lower end of a portion of the outer collecting chute which is located outward relative to the fifth region of the inner collecting chute, a seventh upper opening corresponding to a lower end of the inner collecting chute which is located in the eighth region and a lower end of a portion of the outer collecting chute which is located outward relative to the eighth region of the inner collecting chute, and a fifth lower opening which is placed on the straight line on the same side as a side where the fourth lower opening of the fourth discharge path is placed with respect to the center axis and located outward relative to the fourth lower opening, the fifth discharge path extending from sixth upper opening and the seventh upper opening to the fifth lower opening; and a sixth discharge path having an eighth upper opening corresponding to a lower end of the inner collecting chute which is located in the sixth region and the seventh region and a lower end of a portion of the outer collecting chute which is located outward relative to the sixth region and the seventh region of the inner collecting chute, and a sixth lower opening which is placed on the straight line on the same side as a side where the fifth lower opening of the fifth discharge path is placed with respect to the center axis and located outward relative to the fifth lower opening, the sixth discharge path extending from the eighth upper opening to the sixth lower opening.

2. The object collecting and discharging device of the combination weigher, according to claim 1,
wherein the first discharge path includes a first inclined section having a hollow truncated semi-inverted-cone shape and extending downward at a first inclination angle from a portion of the first upper opening, corresponding to the lower end of the inner collecting chute which is located in the first to fourth regions; and a second inclined section extending from a lower end of the first inclined section to the first lower opening at a second inclination angle which is greater than the first inclination angle; and wherein the fourth discharge path includes a third inclined section having a hollow truncated semi-inverted-cone shape and extending downward at the first inclination angle, from a portion of the fifth upper opening, corresponding to the lower end of the inner collecting chute which is located in the fifth to eighth regions, and a fourth inclined section extending from a lower end of the third inclined section to the fourth lower opening at the second inclination angle.

3. The object collecting and discharging device of the combination weigher, according to claim 1,
wherein the third discharge path is detachably locked with the second discharge path, and the sixth discharge path is detachably locked with the fifth discharge path.

4. The object collecting and discharging device of the combination weigher, according to claim 1,
wherein the second discharge path includes:
a first guide plate extending from a portion of the second upper opening, corresponding to the lower end of the portion of the outer collecting chute which is located outward relative to the first region of the inner collecting chute, to the second lower opening;
a second guide plate extending from a portion of the third upper opening, corresponding to the lower end of the portion of the outer collecting chute which is located outward relative to the fourth region of the inner collecting chute, to the second lower opening;
a first connecting plate connecting a side edge of the first guide plate which is closer to the second region of the inner collecting chute to a side edge of the second guide plate which is closer to the third region of the inner collecting chute and extending such that an outer periphery of the second lower opening is a lower edge of the first connecting plate, the first connecting plate being configured such that an upper edge thereof is cut downward;
a second connecting plate connecting a side edge of the first guide plate which is closer to the eighth region of the inner collecting chute to a side edge of the second guide plate which is closer to the fifth region of the inner collecting chute and extending such that an outer periphery of the second lower opening is a lower edge of the second connecting plate, the second connecting plate being configured such that both end portions of an upper edge thereof extend toward the first discharge path, and a portion between the both end portions of the upper edge is mounted to the first discharge path without a clearance; and
a first mounting plate extending from an entire of the upper edge of the first connecting plate toward the first discharge path and being configured such that a tip end portion thereof is mounted to the first discharge path without a clearance; and wherein the fifth discharge path includes:
a third guide plate extending from a portion of the sixth upper opening, corresponding to the lower end of the portion of the outer collecting chute which is located outward relative to the fifth region of the inner collecting chute, to the fifth lower opening;
a fourth guide plate extending from a portion of the seventh upper opening, corresponding to the lower end of the portion of the outer collecting chute which is located outward relative to the eighth region of the inner collecting chute, to the fifth lower opening;

a third connecting plate connecting a side edge of the third guide plate which is closer to the fourth region of the inner collecting chute to a side edge of the fourth guide plate which is closer to the first region of the inner collecting chute when viewed from the vertical direction, and extending such that an outer periphery of the fifth lower opening is a lower edge of the third connecting plate, the third connecting plate being configured such that both end portions of an upper edge thereof extend toward the fourth discharge path, and a portion between the both end portions of the upper edge is cut downward;

a fourth connecting plate extending so as to connect a side edge of the third guide plate which is closer to the sixth region of the inner collecting chute to a side edge of the fourth guide plate which is closer to the seventh region of the inner collecting chute when viewed from the vertical direction, the fourth connecting plate being configured such that an upper edge thereof is mounted to the fourth discharge path without a clearance; and a second mounting plate extending from an entire of the upper edge of the third connecting plate toward the fourth discharge path and being configured such that a tip end portion thereof is mounted to the fourth discharge path without a clearance.

5. A combination weigher comprising:

the object collecting and discharging device of the combination weigher as recited in claim 1; and a plurality of weighing hoppers which are arranged in a circular shape above a boundary between the inner collecting chute and the outer collecting chute, and each of which is configured to selectively discharge the objects held in the weighing hopper to the inner collecting chute or to the outer collecting chute.

\* \* \* \* \*